United States Patent
Oyama

(10) Patent No.: US 11,335,195 B2
(45) Date of Patent: May 17, 2022

(54) TRAFFIC CONTROL SYSTEM

(71) Applicant: SUBARU CORPORATION, Tokyo (JP)

(72) Inventor: Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 226 days.

(21) Appl. No.: 16/733,007

(22) Filed: Jan. 2, 2020

(65) Prior Publication Data
US 2020/0302789 A1    Sep. 24, 2020

(30) Foreign Application Priority Data

Mar. 19, 2019 (JP) .............................. JP2019-051702

(51) Int. Cl.
| | |
|---|---|
| *G08G 1/0967* | (2006.01) |
| *G08G 1/01* | (2006.01) |
| *G06Q 10/04* | (2012.01) |
| *G01C 21/34* | (2006.01) |
| *G08G 1/16* | (2006.01) |

(52) U.S. Cl.
CPC ..... *G08G 1/096791* (2013.01); *G01C 21/343* (2013.01); *G06Q 10/047* (2013.01); *G08G 1/0112* (2013.01); *G08G 1/096725* (2013.01); *G08G 1/163* (2013.01)

(58) Field of Classification Search
CPC ........... G08G 1/096791; G08G 1/0112; G08G 1/096725; G08G 1/163; G01C 21/343; G06Q 10/047
See application file for complete search history.

(56) References Cited

U.S. PATENT DOCUMENTS

| | | | | |
|---|---|---|---|---|
| 6,282,492 B1 * | 8/2001 | Gorai | ..................... | G01C 21/32 |
| | | | | 701/428 |
| 6,314,369 B1 * | 11/2001 | Ito | ......................... | G01C 21/34 |
| | | | | 370/215 |
| 9,672,734 B1 * | 6/2017 | Ratnasingam | ......... | H04W 4/44 |
| 10,185,327 B1 * | 1/2019 | Konrardy | ................. | B60P 3/12 |

(Continued)

FOREIGN PATENT DOCUMENTS

JP        2017-041070 A        2/2017

*Primary Examiner* — Luis A Martinez Borrero
(74) *Attorney, Agent, or Firm* — McDermott Will & Emery LLP

(57) ABSTRACT

A traffic control system includes a vehicle control system that transmits traveling information during traveling of a vehicle, and a management and control system that collects the traveling information from vehicle control systems of other vehicles and transmit recommended traveling information based on the collected traveling information. The vehicle control system transmits traveling data containing a traveling trajectory of the vehicle as the traveling information, and determines a third traveling route on which the vehicle travels, based on a first traveling route based on the recommended traveling information and a second traveling route based on a recognition result of a traveling environment of the vehicle. The management and control system collects the traveling data of vehicles traveling on a same travel lane and extract highly reliable data, and calculates the recommended traveling information based on the extracted traveling data and transmits the calculated recommended traveling information.

11 Claims, 5 Drawing Sheets

(56) References Cited

U.S. PATENT DOCUMENTS

| | | | |
|---|---|---|---|
| 10,495,480 B1* | 12/2019 | Sivaraman | G01C 21/365 |
| 10,816,982 B2* | 10/2020 | Lee | G08G 1/165 |
| 10,937,314 B2* | 3/2021 | Kim | G08G 1/166 |
| 11,106,922 B2* | 8/2021 | Urano | G06Q 10/02 |
| 2001/0049582 A1* | 12/2001 | Sakashita | G01C 21/3658 |
| | | | 701/437 |
| 2002/0128768 A1* | 9/2002 | Nakano | G01C 21/3626 |
| | | | 701/533 |
| 2013/0218457 A1* | 8/2013 | Mutoh | G01C 21/34 |
| | | | 701/420 |
| 2016/0379486 A1* | 12/2016 | Taylor | G08G 1/08 |
| | | | 340/905 |
| 2017/0098370 A1* | 4/2017 | Park | G08G 1/0967 |
| 2017/0256147 A1* | 9/2017 | Shanahan | G08G 1/096775 |
| 2017/0287331 A1* | 10/2017 | Laur | B62D 15/0285 |
| 2017/0336515 A1* | 11/2017 | Hosoya | G01C 21/28 |
| 2018/0056998 A1* | 3/2018 | Benosman | G08G 1/163 |
| 2018/0061232 A1* | 3/2018 | Madigan | H04W 4/50 |
| 2018/0091981 A1* | 3/2018 | Sharma | G08G 1/0112 |
| 2018/0151066 A1 | 5/2018 | Oba | |
| 2018/0174449 A1* | 6/2018 | Nguyen | G08G 1/08 |
| 2018/0335781 A1* | 11/2018 | Chase | G08G 1/0141 |
| 2019/0018419 A1* | 1/2019 | Lee | B60W 30/18154 |
| 2019/0077402 A1* | 3/2019 | Kim | B60W 30/10 |
| 2019/0088148 A1* | 3/2019 | Jacobus | B60W 10/18 |
| 2019/0202476 A1* | 7/2019 | Tao | B60W 30/095 |
| 2020/0005633 A1* | 1/2020 | Jin | G06F 21/6254 |
| 2020/0272832 A1* | 8/2020 | Urano | G06V 20/58 |
| 2020/0302793 A1* | 9/2020 | Oyama | H04L 67/18 |
| 2021/0009161 A1* | 1/2021 | Kim | G06F 16/29 |
| 2021/0172754 A1* | 6/2021 | Nunkesser | G01C 21/3691 |
| 2021/0199462 A1* | 7/2021 | Namba | G08G 1/22 |
| 2021/0201668 A1* | 7/2021 | Oyama | G08G 1/0133 |
| 2021/0201674 A1* | 7/2021 | Oyama | G08G 1/207 |
| 2021/0319692 A1* | 10/2021 | Ucar | G01C 21/3461 |

* cited by examiner

TRAFFIC CONTROL SYSTEM

CROSS-REFERENCE TO RELATED APPLICATIONS

The present application claims priority from Japanese Patent Application No. 2019-51702 filed on Mar. 19, 2019, the entire contents of which are hereby incorporated by reference.

BACKGROUND

The technology relates to a traffic control system for collecting traveling information of a plurality of vehicles.

Development of a road traffic information providing system for providing information on road traffic conditions to traveling vehicles such as automobiles traveling on roads, particularly a road traffic system called Intelligent Transport Systems (ITS) has been recently promoted.

For example, Vehicle Information and Communication System (VICS: registered trademark in Japan) is known as a road traffic information providing system. VICS is normally a system that mainly provides macro information for a section of a road, and a vehicle can grasp a forward traveling environment by receiving information on obstacles such as falling objects on the road from the VICS.

Furthermore, a technique for recognizing a forward traveling environment by a camera, laser radar or the like, and performing traveling control based on the recognized traveling environment has been also adopted on a vehicle side. Therefore, safer traveling of a vehicle is enabled by using, in combination, information received from an infrastructure side such as VICS and traveling environment information autonomously recognized by a vehicle.

For example, Japanese Unexamined Patent Application Publication (JP-A) No. 2017-41070 discloses a technique of searching a traveling route by using chronological traveling environment information obtained by communication and traveling environment information acquired by a camera or the like, and performing traveling control of a vehicle on the searched traveling route.

SUMMARY

An aspect of the technology provides a traffic control system. The system includes a vehicle control system configured to transmit traveling information during traveling of an own vehicle, and a management and control system configured to collect the traveling information from vehicle control systems of a plurality of vehicles and transmit recommended traveling information based on the collected traveling information. The vehicle control system includes: a traveling data transmitter configured to transmit traveling data containing a traveling trajectory of the own vehicle as the traveling information; and a traveling route determiner configured to determine a third traveling route on which the own vehicle travels, based on a first traveling route based on the recommended traveling information received from the management and control system and a second traveling route based on a recognition result of a traveling environment of the own vehicle. The management and control system includes: a traveling data collector configured to collect the traveling data of a plurality of vehicles traveling on a same travel lane and extract highly reliable data; and a recommended traveling information calculator configured to calculate the recommended traveling information based on the traveling data extracted by the traveling data collector and transmit the calculated recommended traveling information.

An aspect of the technology provides a traffic control system includes a vehicle control system including first circuitry configured to transmit traveling information during traveling of an own vehicle, and a management and control system including second circuitry configured to collect the traveling information from vehicle control systems of a plurality of vehicles, and transmit recommended traveling information based on the collected traveling information. The first circuitry is configured to transmit traveling data including a traveling trajectory of the own vehicle as the traveling information. The first circuitry is configured to determine a third traveling route on which the own vehicle travels, based on a first traveling route based on the recommended traveling information received from the management and control system, and a second traveling route based on a recognition result of a traveling environment of the own vehicle. The second circuitry is configured to collect the traveling data of a plurality of vehicles traveling on a same traveling lane, and extract highly reliable data. The second circuitry is configured to calculate the recommended traveling information based on the extracted traveling data and transmit the calculated recommended traveling information.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

A description is given below of some embodiments of the technology with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following embodiments which are not recited in a most-generic independent claim of the disclosure are optional and may be provided on an as-needed basis. The drawings are schematic and are not intended to be drawn to scale.

A vehicle cannot avoid falling objects just before the falling objects are reflected in information on the infrastructure side such as VICS, and ruts on roads, puddles, cracks of road surfaces, etc., that are not reflected in information on the infrastructure side until the vehicle comes just before the falling objects, or the like. For this reason, simply and univocally combining the information on the infrastructure side and the information on the vehicle side as disclosed in JP-A No. 2017-41070 may be insufficient to enable safety and stable traveling of a vehicle to be performed and realize a smooth traffic flow.

Accordingly, it is desirable to provide a traffic control system that enables safety and stable traveling of a vehicle and can realize a smooth traffic flow.

Figure 1:
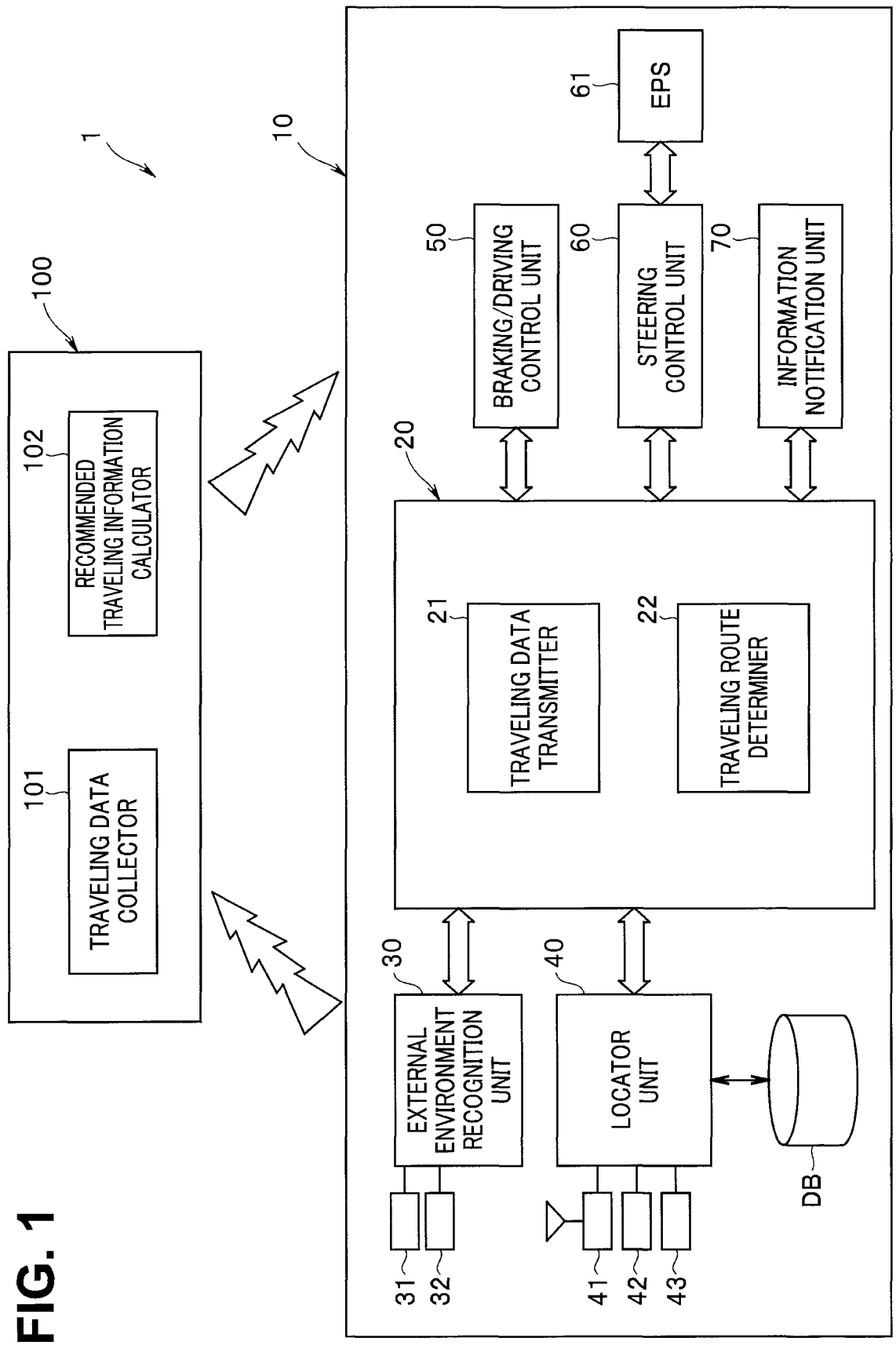
FIG. 1 is an overall configuration diagram of a traffic control system according to an embodiment of the technology.

An embodiment of the technology will be described below with reference to the drawings. FIG. 1 is an overall configuration diagram of a traffic control system. As illustrated in FIG. 1, the traffic control system 1 according to the embodiment is configured to include a vehicle control system 10 of each vehicle configured to transmit traveling information of the vehicle during traveling under automatic driving to a network based on cloud computing (hereinafter simply referred to as a "cloud"), and a cloud-linkage management and control system 100 configured to collect and process traveling information of a plurality of vehicles.

In the present embodiment, the vehicle control system 10 includes, as a main component, an automatic driving control unit 20 for controlling traveling under automatic driving that does not require any driving operation of a vehicle occupant. An external environment recognition unit 30, a locator unit 40, a braking/driving control unit 50, a steering control unit 60, an information notification unit 70, and the like are mutually and communicatively coupled to the automatic driving control unit 20 through an in-vehicle network.

The external environment recognition unit 30 includes various devices for environment recognition such as a camera unit 31 and a radar device 32 such as a millimeter wave radar or a laser radar. The external environment recognition unit 30 recognizes an external environment around an own vehicle based on detection information of objects around the own vehicle detected by the camera unit 31 or the radar device 32, traffic information acquired by infrastructure communication such as road-to-vehicle communication and vehicle-to-vehicle communication, position information of the own vehicle measured by a locator unit 40 and the like.

For example, when a stereo camera configured by two cameras for capturing images of the same object from different viewpoints is mounted as the camera unit 31 in the own vehicle, the external environment recognition unit 30 performs stereo processing on a pair of right and left images captured by the stereo camera to recognize an external environment three-dimensionally. The camera unit 31 as the stereo camera is configured, for example, by arranging two shutter-synchronized color cameras each having an imaging element such as CCD or CMOS on right and left sides in a vehicle width direction with a predetermined baseline length in the vicinity of a room mirror located at an upper part of the vehicle interior inside the windshield.

The pair of right and left images captured by the camera unit 31 as the stereo camera is subjected to matching processing to determine a pixel shift amount (parallax) at corresponding positions on the right and left images, and the pixel shift amount is converted into luminance data or the like to generate a distance image. Points on the distance image are coordinate-transformed to points in a real space with the own vehicle centered therein according to the principle of triangulation, and right and left lane lines defining a traveling lane of a road on which the own vehicle travels, obstacles, vehicles traveling ahead of the own vehicle, etc., are three-dimensionally recognized.

The right and left lane lines of the road can be recognized by extracting a point group as candidates for each of lane lines from an image and calculating a straight line or a curved line connecting the candidate points. For example, within a lane line detection region set on the image, edges which change in luminance by a predetermined value or more on a plurality of search lines set in a horizontal direction (vehicle width direction) are detected, and a pair of a lane line start point and a lane line end point are detected for each search line, whereby an intermediate region between the lane line start point and the lane line end point is extracted as lane line candidate points.

Time-series data of spatial coordinate positions of lane line candidate points based on a vehicle movement amount per unit time are processed to calculate a model approximating the right and left lane lines, thereby recognizing the lane lines. As a lane line approximating model, an approximate model obtained by connecting linear components obtained by the Hough transform, or a model approximated by a curve such as a quadratic equation can be used.

The locator unit 40 mainly performs positioning based on signals from a plurality of navigation satellites such as Global Navigation Satellite System (GNSS) satellites, and detects the vehicle position of the own vehicle. When the positioning accuracy deteriorates due to a capturing state of signals (radio waves) from satellites, the influence of multipath caused by reflection of radio waves or the like, the locator unit 40 detects the vehicle position of the own vehicle by performing the positioning based on autonomous navigation using in-vehicle sensors such as a gyro sensor 42 and a vehicle speed sensor 43 in combination.

According to the positioning based on the plurality of navigation satellites, signals containing information on the orbit, time, etc., transmitted from the navigation satellites are received via a receiver 41, and the own position of the own vehicle is measured as an absolute position containing longitude, latitude, altitude, and time information based on the received signals. Furthermore, according to the positioning based on the autonomous navigation, the position of the own vehicle as a relative positional change is measured based on the traveling azimuth of the own vehicle detected by the gyro sensor 42 and the moving distance of the own vehicle calculated from a vehicle speed pulse output from the vehicle speed sensor 43 or the like.

The locator unit 40 includes a map database DB, and specifies the position on map data of the map database DB from position data of the positioned own vehicle. The map database DB is a database that holds a high-precision map created for control of traveling containing automatic driving, and is stored in a large-capacity storage medium such as a hard disk drive (HDD) or a solid state drive (SSD).

For example, the high-precision map is configured as a multi-dimensional map (dynamic map) that holds, in multiple hierarchies, static information such as road shapes and connection relationships among roads and dynamic information such as traffic information collected by infrastructure communication. Road data include types of road lane lines, the number of traveling lanes, a width of each of the traveling lanes, point sequence data indicating the center position in a width direction of each of the traveling lanes, curvature of each of the traveling lanes, a traveling azimuth angle of each of the traveling lanes, a speed limit, etc., and are stored together with attribute data such as data reliability and data update date.

Further, the locator unit 40 performs maintenance management of the map database DB, verifies nodes, links, and data points of the map database DB to keep them in an up-to-date state at all time, and creates and adds new data for areas for which no data exists on the database, thereby configuring a more detailed database. Update of data and addition of new data in the map database DB are performed by collating the measured position data with the data stored in the map database DB.

The braking/driving control unit 50 controls traveling driving force to be generated by an electric motor or an internal combustion engine, and controls a traveling speed of the own vehicle, switching between forward movement and reverse movement, braking, and the like. For example, the braking/driving control unit 50 controls an operation state of the engine based on signals from various sensors for detecting the operation state of the engine and various control information acquired via the in-vehicle network, and also controls braking devices (not illustrated) for four wheels based on a brake switch, wheel speeds of the four wheels, a steering angle, a yaw rate, and other vehicle information, independently of a braking operation of an occupant (driver). Further, the braking/driving control unit 50 calculates brake fluid pressure of each wheel based on the brake force of each wheel to perform control of an anti-lock braking system, side slip prevention and the like.

The steering control unit 60 controls a steering torque by the electric power steering (EPS) unit 61 provided in a steering system, for example, based on a vehicle speed, a driver's steering torque, a steering angle, a yaw rate, and other vehicle information. The control of the steering torque is performed as current control for the electric motor of the EPS unit 61 that realizes a target steering torque for making an actual steering angle coincide with the target steering angle. The EPS unit 61 uses the target steering torque from the steering control unit 60 as an instruction torque, and controls the drive current of the electric motor corresponding to the instruction torque, for example, by PID control.

The information notification unit 70 controls the outputs of an alarm when abnormality occurs in various devices of the vehicle or an alarm for calling driver's attention, and various information to be presented to the driver. For example, a warning or control information is notified by using at least one of a visual output such as a monitor, a display or an alarm lamp, or an auditory output such as a speaker or a buzzer. During the traveling control containing automatic driving, the information notification unit 70 presents a control state of the traveling control to the driver, and when the traveling control containing the automatic driving is suspended by a driver's operation, the driving state at that time is notified to the driver.

Next, the automatic driving control unit 20 serving as a main component of the vehicle control system 10 will be described. When the driver selects a driving support mode in which the driver operates a switch or a panel (not illustrated) to support a driver's driving operation or an automatic driving mode which does not require the driver's driving operation in place of a manual driving mode in which the driver performs all driving operations such as steering, acceleration/deceleration and braking to drive the own vehicle, the automatic driving control unit 20 performs traveling control via the braking/driving control unit 50 and the steering control unit 60 based on information from the external environment recognition unit 30 and the locator unit 40.

Note that in the present embodiment, the driving support mode means a driving mode that requires the driver to hold a steering wheel or steer, and automatically performs at least one of acceleration/deceleration control or steering control, and is assumed to contain partial automatic driving. On the other hand, the automatic driving mode means a driving mode presupposing hands-off driving in which the driver does not touch the steering wheel, and is a conditional automatic driving mode in which all of the acceleration/deceleration control and the steering control are automatically performed in an operation region in design where the automatic operation function operates normally.

The automatic driving mode is canceled when the driver performs an override operation such as holding the steering wheel or steering with a steering torque of a set value or more, stepping on a brake pedal or stepping on an accelerator pedal. Furthermore, in the automatic driving mode, when it is difficult to continue the operation by the system, the automatic driving is canceled and the driving is entrusted to manual driving by the driver.

When an occupant (driver) turns on the automatic driving mode, inputs information on a destination and waypoints (facility names, addresses, telephone numbers, etc.) or directly specifies the information on a map displayed on a panel or the like, the automatic driving control unit 20 sets position coordinates (latitude, longitude) of a traveling route via the locator unit 40, or on a motorway or the like, a road and a traveling lane on which the vehicle travels is specified without specifying a destination and a traveling route by turning on the automatic driving mode during traveling on a main lane. The automatic driving control unit 20 calculates the center position in the width direction of the specified traveling lane of the specified road by using map data and an in-vehicle sensor such as the camera unit 31, and sets a trajectory in the traveling direction of the center position of the traveling lane as a target route under automatic driving. The same applies when neither a destination nor a traveling lane is specified, and a trajectory in the traveling direction of the center position of the traveling lane is set as a target route under automatic driving.

The automatic driving control unit 20 sets a vehicle speed or a road speed limit set by the driver as a target vehicle speed under automatic driving, and causes the own vehicle to automatically travel to a destination along a target route while appropriately adjusting the target vehicle speed according to curvature of the travel route, a type and a gradient of the road, the distances from other vehicles, etc. When neither a destination nor a traveling route is specified, the own vehicle is caused to travel so as to follow the center position of the traveling lane.

Based on the information from the external environment recognition unit 30, the locator unit 40, and the in-vehicle sensor, the automatic driving control unit 20 detects traveling information such as the position in a lateral direction (lateral position) of the own vehicle with respect to the target route (the center position of the traveling lane), a yaw angle with respect to the target route in the traveling direction of the own vehicle and the vehicle speed. The automatic driving control unit 20 performs steering control following the target route via the steering control unit 60 and the EPS unit 61, and performs the acceleration/deceleration control to the target speed via the braking/driving control unit 50.

During the traveling control to the automatic driving, the automatic driving control unit 20 transmits the traveling information of the own vehicle to the cloud, and receives recommended traveling information from the management and control system 100 via the cloud. As function units associated with the cloud-linkage traveling information, the automatic driving control unit 20 includes a traveling data transmitter 21 and a traveling route determiner 22, and the management and control system 100 includes a traveling data collector 101, and a recommended traveling information calculator 102.

Normally, the automatic driving control unit 20 performs traveling control so that deviation amounts of the lateral position and yaw angle of the own vehicle from the target route converge within preset control ranges, and a deviation amount of the speed of the own vehicle from the target speed converges within a preset control range. However, depending on some traveling environment, there is a case where it is desirable for the own vehicle to travel on a route different from the preset target route or to travel at a speed different from the preset target speed.

For example, when the external environment recognition unit 30 recognizes such a situation in which an obstacle, a rut, a frozen place or the like exists on a road of a preset target route, the automatic driving control unit 20 controls the own vehicle to travel on a route different from the preset target route or travel at a speed different from the preset target speed in order to avoid the obstacle, the rut, the frozen place or the like.

Figure 2:
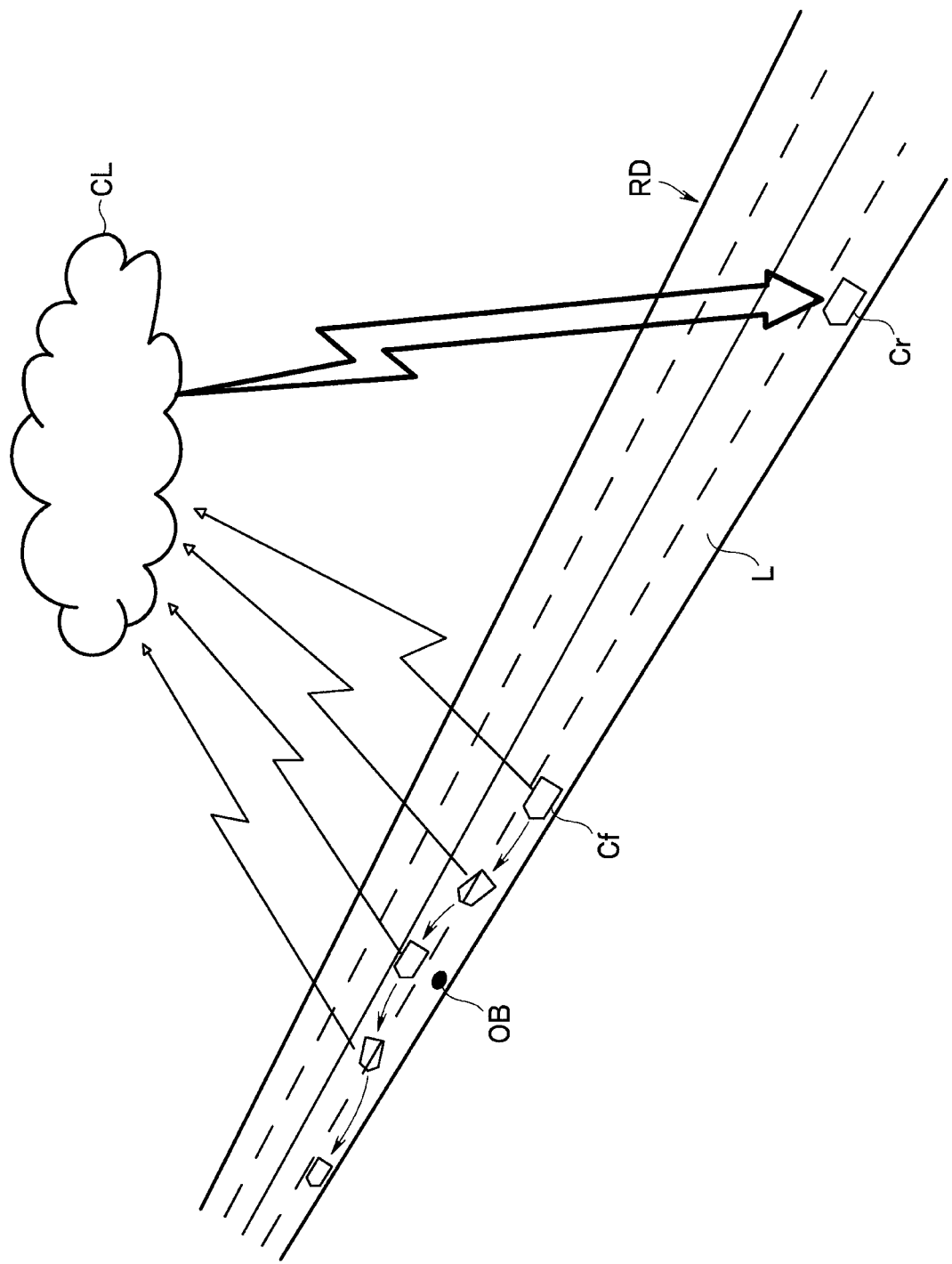
FIG. 2 is an explanatory diagram illustrating transmission of traveling information and reception of recommended traveling information.

As illustrated in FIG. 2, the traveling data transmitter 21 sets, as traveling information, the traveling data containing a traveling trajectory on which the own vehicle has actually traveled, and transmits the traveling data containing the traveling trajectory to the cloud CL at every predetermined distance or in every predetermined time. The traveling data includes a lateral position of the own vehicle with respect to the center position of a traveling lane, a traveling speed, the presence/absence of an obstacle, position information, passage time, at each point etc., and the traveling data including these pieces of information are uploaded onto the cloud CL.

FIG. 2 is an explanatory diagram illustrating transmission of traveling information and reception of recommended traveling information. FIG. 2 illustrates the situation in which an obstacle OB such as a falling object is present on a traveling lane L of a road RD, and the traveling data of a vehicle Cf which travels while avoiding the obstacle OB is transmitted to the cloud CL. Recommended traveling information calculated from the traveling data transmitted to the cloud CL is transmitted to a vehicle Cr which approaches the obstacle OB from the rear.

The vehicle Cf travels while changing the course from the center position of the traveling lane L as the target route to the right in order to avoid the obstacle OB present on a left side in the traveling direction of the traveling lane L. At this time, the traveling data transmitted from the vehicle Cf to the cloud CL changes from a traveling trajectory near the center position of the traveling lane L (target route) to a traveling trajectory closer to a right side of the traveling lane L. Note that traveling data of a plurality of traveling vehicles which have avoided the obstacle OB are uploaded onto the cloud CL in addition to the traveling data of the vehicle Cf.

The traveling data of each vehicle uploaded onto the cloud CL is collected by the traveling data collector 101 of the management and control system 100. Based on the collected traveling data, the recommended traveling information calculator 102 calculates recommended traveling information for coping with a situation deviating from a normal traveling state like a case of avoiding an obstacle.

The traveling data collector 101 collects traveling data of a plurality of vehicles traveling on the same traveling lane, extracts highly reliable information from the collected traveling data of the plurality of vehicles, and sends the extracted information to the recommended traveling information calculator 102. The highly reliable information is extracted by removing old data after a lapse of a set time or longer, or removing new data that deviates from an average value of traveling data of the plurality of vehicles by a set value or more.

The recommended traveling information calculator 102 calculates the recommended traveling information for each vehicle on a travel lane as a target based on the traveling data collected and extracted by the traveling data collector 101, and transmits the calculated recommended traveling information to the cloud. The recommended traveling information is assumed to avoid obstacles to traveling, and for example, a recommended route for avoiding falling objects on a road, a warning for a frozen place of a road surface, a recommended passing speed (deceleration instruction) and the like are transmitted as the recommended traveling information. Therefore, when traveling loci of a plurality of traveling vehicles are within a predetermined range from the center position of the traveling lane (for example, a range of control for following a target route under normal automatic driving) and passing speeds of the traveling vehicles are not more than the speed limit, unnecessary recommended driving information is not transmitted.

Figure 3:
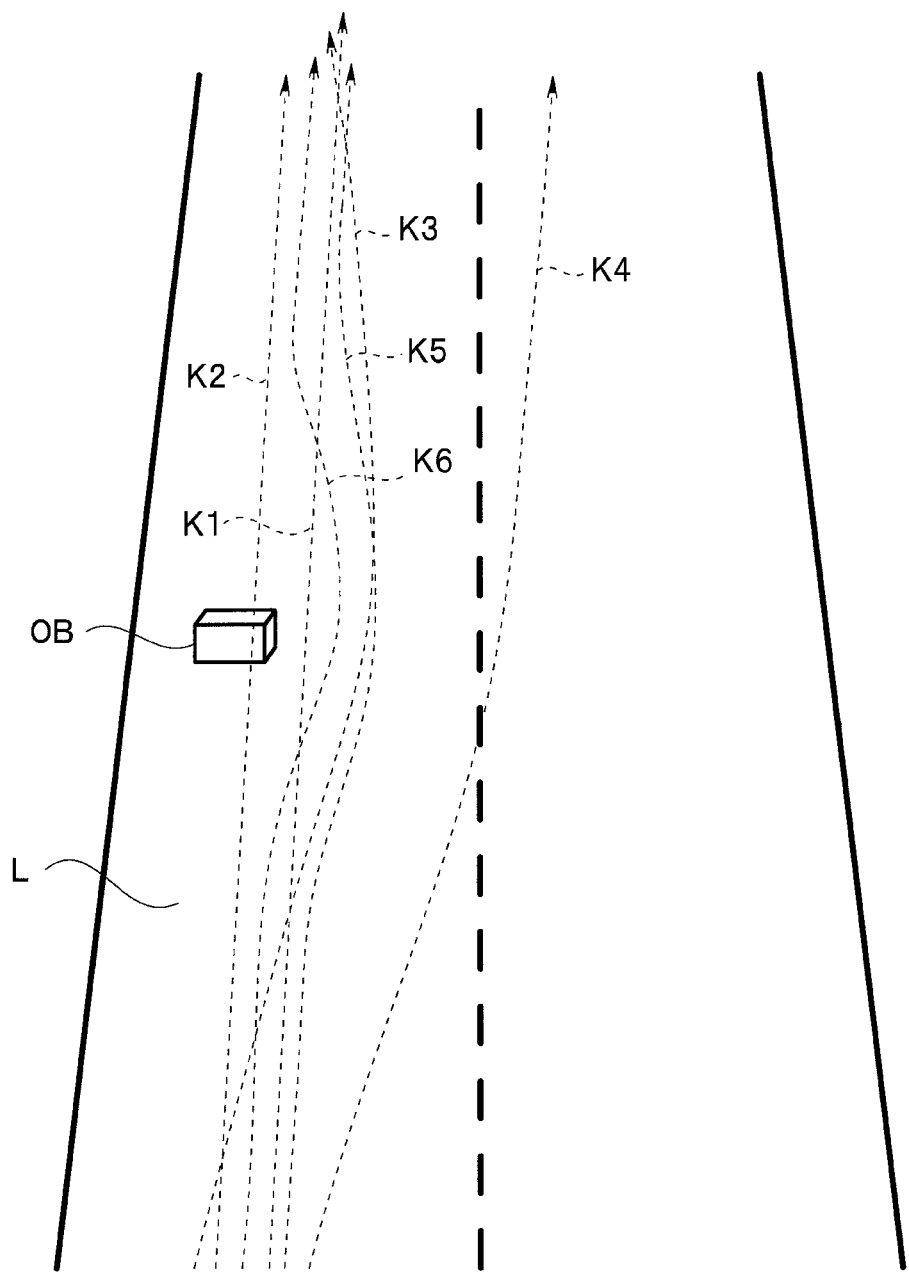
FIG. 3 is an explanatory diagram illustrating traveling loci with respect to an obstacle on a traveling lane.

FIG. 3 is an explanatory diagram illustrating traveling loci with respect to an obstacle on a traveling lane. As illustrated in FIG. 3, when traveling loci that have avoided a falling object (obstacle) OB on a traveling lane L are transmitted from a plurality of vehicles, the traveling loci are collected by the traveling data collector 101 to extract highly reliable data, and the recommended route for avoiding the obstacle OB is calculated as the recommended traveling information from the recommended traveling information calculator 102.

Traveling loci K1 and K2 out of the traveling loci K1 to K6 of the plurality of vehicles illustrated in FIG. 3 are traveling loci of the vehicles that passed before the obstacle OB appeared, and the traveling loci K1 and K2 are discarded as low reliable old data by the traveling data collector 101. Since a traveling trajectory K4 deviates from the traveling lane L and greatly differs from the other traveling loci, the traveling trajectory K4 is discarded as low reliable data by the traveling data collector 101.

The recommended traveling information calculator 102 performs averaging processing on the remaining traveling loci K3, K5, and K6 which are relatively new and approximate to one another, to calculate an average traveling trajectory of the plurality of vehicles which have passed while avoiding the obstacle OB as the recommends route. The recommended travel information calculator 102 transmits the recommended traveling information containing the recommended route via the cloud CL to the vehicle Cr approaching the obstacle OB from the rear.

In this case, for example, when the traveling loci avoiding the obstacle OB are divided into two groups so as to avoid a specific route like such a case that the traveling loci are divided into right and left sides, no averaging processing is daringly performed, and the recommended traveling information is transmitted with two recommended routes being contained in the recommended traveling information. When the dispersion of the plurality of traveling loci is large, no recommended traveling information is daringly transmitted.

When no recommended traveling information is transmitted from the management and control system 100, the vehicle control system 10 of the vehicle performs traveling control according to a preset target route. On the other hand, when the recommended traveling information is received from the management and control system 100, the vehicle control system 10 determines a third route on which the own vehicle travels by the traveling route determiner 22 of the automatic driving control unit 20, based on a first traveling route based on the received recommended traveling information and a second traveling route based on a recognition result of the traveling environment via the external environment recognition unit 30 and the locator unit 40.

Here, the second traveling route is a traveling route in a state where no recommended traveling information is transmitted from the management and control system 100, that is, in a normal state where a large number of vehicles are traveling near the center of the traveling lane, and is a target route under the automatic driving which is set by the vehicle control system 10.

When receiving the recommended traveling information, the traveling route determiner 22 determines that there is a possibility that a hindrance causing a change of a present target route (second traveling route) has occurred in a forward section corresponding to the received recommended traveling information. Therefore, the traveling route determiner 22 determines whether there is no hindrance even if the vehicle actually travels on the first traveling route, based on the recommended traveling information, by the situation such as the presence or absence of an obstacle on the road, the presence or absence of an approaching oncoming vehicle, the presence or absence of a subsequent overtaking vehicle, or the like.

When no obstacle is found on the road, neither an oncoming vehicle nor an overtaking vehicle is present, and it is determined that no trouble occurs in traveling even if the present target route is changed to the first traveling route, the traveling route determiner 22 changes the present target route to the first travel route based on the recommended traveling information, and determines the first traveling route as the third traveling route on which the own vehicle travels in the section concerned.

On the other hand, when it is determined that the first traveling route based on the recommended traveling information causes a hindrance to the traveling, the traveling route determiner 22 corrects the present target route (second traveling route) based on the recommended traveling information, thereby enabling the vehicle to pass through the section concerned. For example, in such a situation that an oncoming vehicle approaches to and passes by the own vehicle, or in such a situation that a subsequent overtaking vehicle approaches from the rear, correction to the present traveling route (target route) is performed at the minimum level while decelerating to the extent that the own vehicle can avoid the obstacle, thereby ensuring safety.

Figure 4:
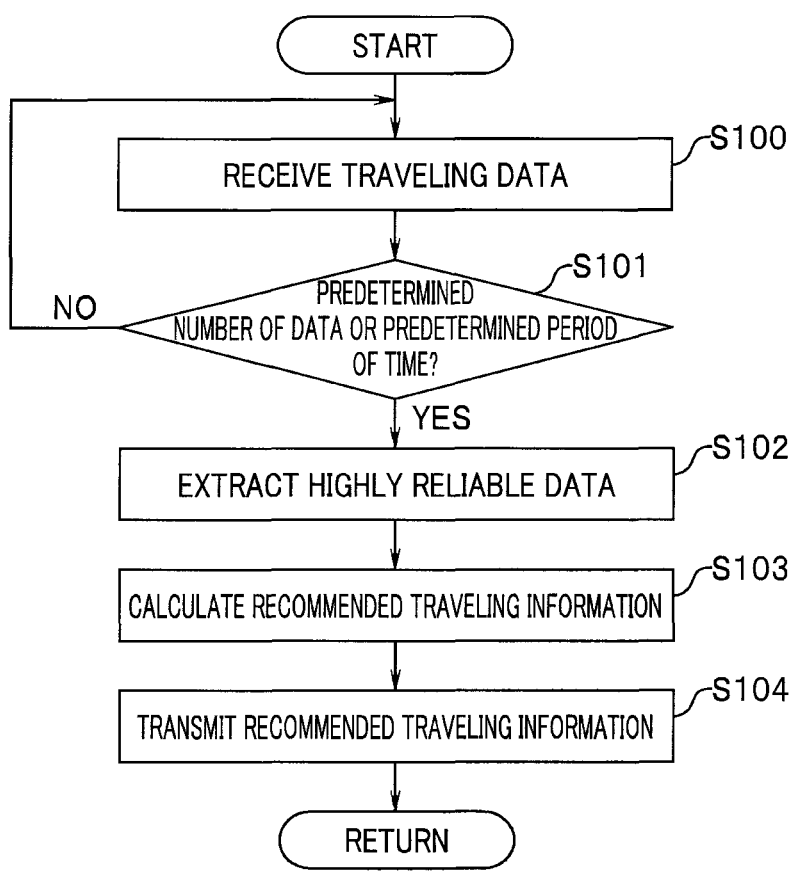
FIG. 4 is a flowchart illustrating processing on a management and control system side.
Figure 5:
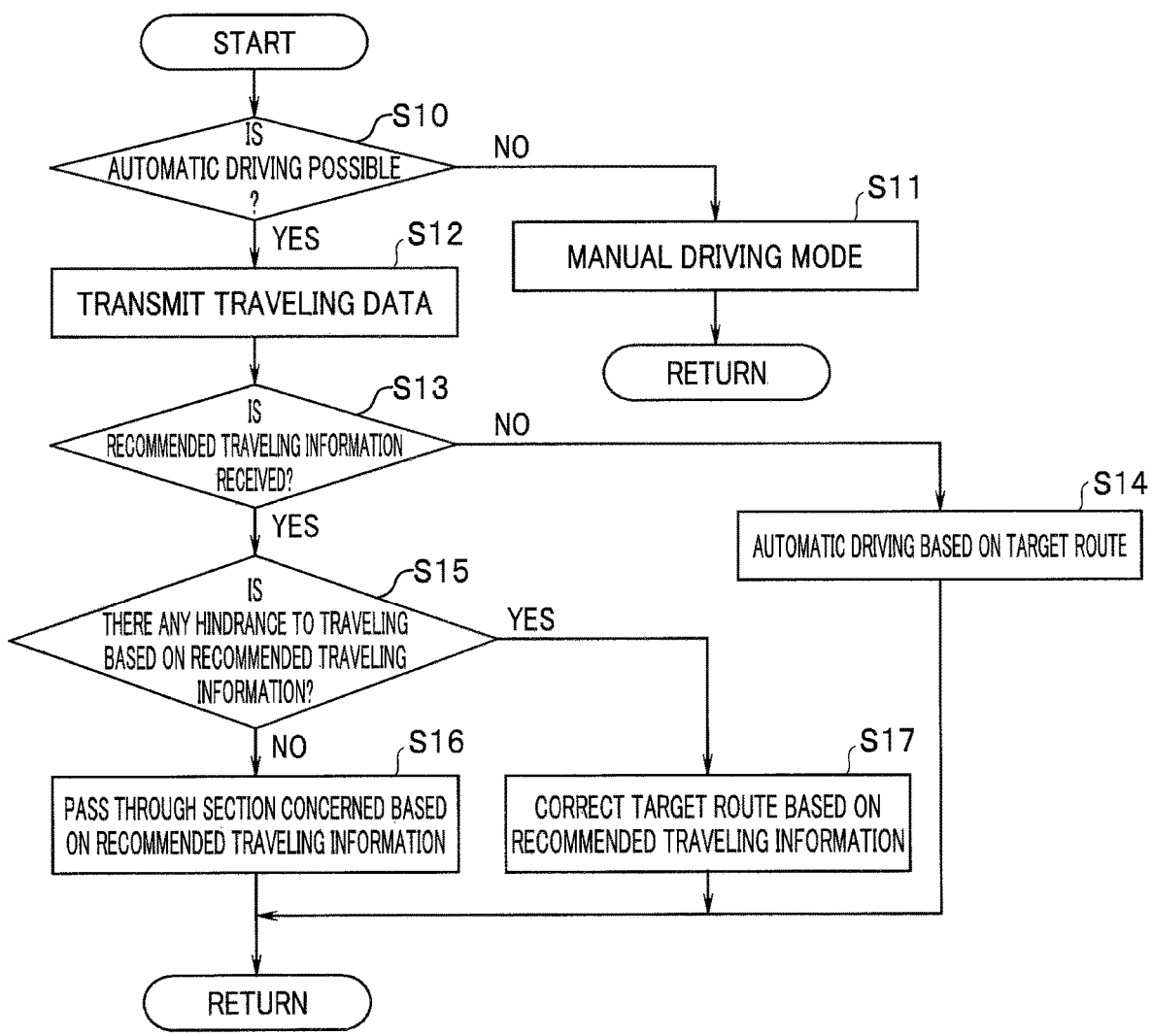
FIG. 5 is a flowchart illustrating processing on a vehicle control system side.

Next, an operation of the traffic control system 1 will be described with reference to the flowcharts of FIGS. 4 and 5. FIG. 4 is a flowchart illustrating processing on a management and control system side, and FIG. 5 is a flowchart illustrating processing on a vehicle control system side.

First, the processing on the management and control system side in FIG. 4 will be described. As processing of the traveling data collector 101, the management and control system 100 receives the traveling data in step S100, and checks whether the traveling data have been received by a predetermined number or for only a predetermined period of time in step S101. When the traveling data have not been collected by the predetermined number or for only the predetermined period of time, data collection is continued by data reception in step S100. When the number of the collected traveling data has reached the predetermined number or that the traveling data has received for the predetermined period of time, the processing proceeds to step S102.

In step S102, the management and control system 100 deletes, from the collected traveling data, old information after the lapse of the set period of time or longer or data deviating from the average data, thereby extracting highly reliable data. Subsequent step S103 is processing in the recommended traveling information calculator 102 of the management and control system 100, and the recommended traveling information is calculated based on the highly reliable data extracted from the collected travel data.

Thereafter, the processing proceeds to step S104, and the recommended traveling information calculator 102 transmits the recommended traveling information calculated in step S103 with the position information of the section concerned being contained in the recommended traveling information. In this case, when a vehicle traveling to the section concerned can be detected from incidental facilities of roads, etc., the recommended traveling information is transmitted to vehicles located within a set range in front of the section concerned. When the present position of each vehicle cannot be detected on the management and control system 100 side, determination is made, on the vehicle side, regarding whether the recommended traveling information is adopted, based on the position information of the section concerned contained in the recommended traveling information received from the cloud.

Next, processing on the vehicle control system side in FIG. 5 will be described. In first step S10, the vehicle control system 10 determines, in the automatic driving control unit 20, whether automatic driving is possible. For example, when it is difficult to continue the automatic driving because abnormality occurs in a part of the system, the vehicle gets out of the operation area of the automatic driving or the like, the automatic driving control unit 20 determines that it is impossible to continue the automatic driving, and proceeds the processing from step S10 to step S11 to request the occupant to take over the driving. As a result, the driving mode shifts from the automatic driving mode to the manual driving mode.

On the other hand, when the automatic driving is possible in step S10, the processing proceeds from step S10 to step S12, and the automatic driving control unit 20 transmits the traveling data containing the traveling trajectory of the own vehicle to the cloud every certain period of time or at an interval of a certain distance as the processing of the traveling data transmitter 21.

Then, the processing proceeds to step S13, and the automatic driving control unit 20 checks whether the recommended traveling information has been received from the management and control system 100. When no recommended traveling information has been received, the processing proceeds from step S14 to step S15, and the automatic driving control unit 20 continues the automatic driving by traveling while following the target route.

On the other hand, when the recommended traveling information has been received in step S13, the automatic driving control unit 20 proceeds from step S13 to step S15 to determine the presence or absence of an obstacle which will hinder the traveling route of the section concerned (the first traveling route) based on the recommended traveling information as the processing of the traveling route determiner 22.

As a result, when determining that there is no obstacle, in step S16, the automatic driving control unit 20 changes the target route (second traveling route) which has been used up to the present time to the travel route based on the recommended traveling information (first traveling route), to determine the first traveling route as a traveling route (third traveling route) on which the vehicle will travel in the section concerned, and causes the vehicle to pass through the section concerned. On the other hand, when determining that there is an obstacle, in step S17, the automatic driving control unit 20 corrects the present target route based on the recommended traveling information, to determine a travel route (third traveling route) on which the vehicle travels in the section concerned, and causes the vehicle to pass through the section concerned.

As described above, in the present embodiment, the traveling data containing the traveling loci under automatic driving are transmitted from the vehicle control systems 10 of a plurality of vehicles, and these traveling data of the plurality of vehicles are collected in the management and control system 100. The recommended traveling information for coping with a situation in which a vehicle deviates from a normal traveling state is calculated from the collected travel data, and transmitted to each of the vehicles. When each of the vehicles passes through the section concerned, the vehicle control system 10 determines the third traveling route for traveling through the section concerned based on the first traveling route based on the recommended traveling information received from the management and control system 100 and the second traveling route based on the recognition result of the traveling environment via the external environment recognition unit 30 and the locator unit 40.

As a result, it is possible to cope with a change of the traveling environment caused by a falling object just before the change is reflected in VICS information, etc., and it is possible to safely avoid, well in advance, ruts, puddles, snowdrifts, cracks on a road surface, etc., that are not reflected in the information. Furthermore, it is possible to achieve optimal traveling matched with the traveling environment, such as passing through an optimal route of a curve and an optimal traveling speed in accordance with an actual weather, which enables each vehicle to perform safer and more stable traveling, whereby a smooth flow of traffic can be realized.

Each of the vehicle control system 10 and the management and control system 100 of the traffic control system 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle control system 10 or the management and control system 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A traffic control system comprising:
    a management and control system configured to i) collect, from a plurality of first vehicles each travelled through a concerned section of a target traveling lane, traveling data including traveling trajectories taken by corresponding vehicles through the concerned section of the target traveling lane, ii) extract reliable data from the collected traveling data, and iii) calculate recommended traveling information related to the concerned section of the target traveling lane based on the extracted reliable data; and
    a vehicle control system provided on a second vehicle that is i) traveling on the target traveling lane according to a set target traveling route and ii) approaching the concerned section of the target traveling lane, the set target traveling route being determined based on a traveling environment surrounding the second vehicle recognized by an external recognition unit provided on the second vehicle, the vehicle control system being configured to transmit a traveling trajectory of the second vehicle to the management and control system,
    wherein the management and control system is configured to:
        extract the reliable data by removing, from the traveling data of the plurality of vehicles, i) data that is a set period of time or older or ii) data that deviates, by a set value or more, from an average value of the traveling data of the plurality of vehicles so that the reliable data includes remaining traveling trajectories of the traveling trajectories of the corresponding vehicles,
        perform averaging processing on the remaining traveling trajectories to calculate an average traveling trajectory and determine a recommended route based on the average traveling trajectory, and
        transmit the recommended traveling information including the recommended route to the vehicle control system of the second vehicle,
    wherein in response to receiving the recommended traveling information, the vehicle control system is configured to determine a traveling route on which the second vehicle travels in the concerned section based on routes including the recommended traveling route and the set target traveling route, and
    wherein the vehicle control system is configured to control the second vehicle to travel through the concerned section based on the determined traveling route.

2. The traffic control system according to claim 1, wherein the recommended traveling information includes, for each section of the target traveling lane, i) a lateral position with respect to a center position of the target traveling lane and ii) a traveling speed.

3. The traffic control system according to claim 2, wherein when there is no hindrance to traveling based on the set target traveling route, the traveling route determiner is configured to determine the traveling route based on the set target traveling route, and when there is a hindrance to the traveling based on the set target traveling route, the traveling route determiner is configured to determine the traveling route based on the recommended traveling route.

4. The traffic control system according to claim 2, wherein the vehicle control system and the management and control system are configured to be linked with each other through a network based on cloud computing.

5. The traffic control system according to claim 1, wherein when there is no hindrance to traveling based on the set target traveling route, the traveling route determiner is configured to determine the traveling route based on the set target traveling route, and when there is a hindrance to the traveling based on the set target traveling route, the traveling route determiner is configured to determine the traveling route based on the recommended traveling route.

6. The traffic control system according to claim 1, wherein the vehicle control system and the management and control system are configured to be linked with each other through a network based on cloud computing.

7. The traffic control system according to claim 1, wherein when determining that the traveling trajectories taken by the corresponding vehicles through the concerned section are within a predetermined range from a center position of the target traveling lane and that passing speeds of the corresponding vehicles are not more than a predetermined speed, the management and control system is configured to avoid transmitting the recommended traveling information to the vehicle control system of the second vehicle.

8. The traffic control system according to claim 1, wherein the vehicle control system determines, based on the recommended traveling information related to the concerned section of the target traveling lane, whether a hindrance is absent or present ahead in the target traveling lane,
when the hindrance is determined to be absent in the target travel lane, the vehicle control system i) changes the set target traveling route to a recommended traveling route determined based on the received recommended traveling information and ii) controls the second vehicle to travel through the concerned section of the target traveling lane according to the recommended traveling route, and
when the hindrance is determined to be present in the target travel lane, the vehicle control system i) adjusts the set target traveling route based on the received recommended traveling information and ii) controls the second vehicle to travel through the concerned section of the target traveling lane according to the adjusted set target traveling route.

9. A traffic control system comprising:
a management and control system comprising second circuitry configured to i) collect, from a plurality of first vehicles each travelled through a concerned section of a target traveling lane, traveling data including traveling trajectories taken by corresponding vehicles through the concerned section of the target traveling lane, ii) extract reliable data from the collected traveling data, and iii) calculate recommended traveling information related to the concerned section of the target traveling lane based on the extracted reliable data; and
circuitry provided on a second vehicle that is i) traveling on the target traveling lane according to a set target traveling route and ii) approaching the concerned section of the target traveling lane, the set target traveling route being determined based on a traveling environment surrounding the second vehicle recognized by an external recognition unit provided on the second vehicle, the circuitry being configured to transmit a traveling trajectory of the second vehicle to the management and control system,
wherein the management and control system is configured to:
extract the reliable data by removing, from the traveling data of the plurality of vehicles, i) data that is a set period of time or older or ii) data that deviates, by a set value or more, from an average value of the traveling data of the plurality of vehicles so that the reliable data includes remaining traveling trajectories of the traveling trajectories of the corresponding vehicles,
perform averaging processing on the remaining traveling trajectories to calculate an average traveling trajectory and determine a recommended route based on the average traveling trajectory, and
transmit the recommended traveling information including the recommended route to the circuitry of the second vehicle,
wherein in response to receiving the recommended traveling information, the circuitry is configured to determine a traveling route on which the second vehicle travels in the concerned section based on routes including the recommended traveling route and the set target traveling route, and
wherein the circuitry is configured to control the second vehicle to travel through the concerned section based on the determined traveling route.

10. The traffic control system according to claim 9, wherein when determining that the traveling trajectories taken by the corresponding vehicles through the concerned section are within a predetermined range from a center position of the target traveling lane and that passing speeds of the corresponding vehicles are not more than a predetermined speed, the management and control system is configured to avoid transmitting the recommended traveling information to the circuitry of the second vehicle.

11. The traffic control system according to claim 9, wherein
the circuitry determines, based on the recommended traveling information related to the concerned section of the target traveling lane, whether a hindrance is absent or present ahead in the target traveling lane,
when the hindrance is determined to be absent in the target travel lane, the circuitry i) changes the set target traveling route to a recommended traveling route determined based on the received recommended traveling information and ii) controls the second vehicle to travel through the concerned section of the target traveling lane according to the recommended traveling route, and
when the hindrance is determined to be present in the target travel lane, the circuitry i) adjusts the set target traveling route based on the received recommended traveling information and ii) controls the second vehicle to travel through the concerned section of the target traveling lane according to the adjusted set target traveling route.

* * * * *